(12) United States Patent
Oka

(10) Patent No.: US 11,114,657 B2
(45) Date of Patent: Sep. 7, 2021

(54) NEGATIVE ELECTRODE FOR METAL SECONDARY BATTERY, METAL SECONDARY BATTERY, AND METHOD OF PRODUCING METAL SECONDARY BATTERY

(71) Applicant: TOYOTA JIDOSHA KABUSHIKI KAISHA, Toyota (JP)

(72) Inventor: Hideaki Oka, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/236,796

(22) Filed: Dec. 31, 2018

(65) Prior Publication Data

US 2019/0245201 A1 Aug. 8, 2019

(30) Foreign Application Priority Data

Feb. 5, 2018 (JP) .............................. JP2018-018150

(51) Int. Cl.
| | |
|---|---|
| *H01M 4/36* | (2006.01) |
| *H01M 4/62* | (2006.01) |
| *H01M 10/0565* | (2010.01) |
| *H01M 4/04* | (2006.01) |
| *H01M 4/38* | (2006.01) |
| *H01M 4/02* | (2006.01) |

(52) U.S. Cl.
CPC ......... *H01M 4/366* (2013.01); *H01M 4/0445* (2013.01); *H01M 4/382* (2013.01); *H01M 4/625* (2013.01); *H01M 10/0565* (2013.01); *H01M 2004/027* (2013.01); *H01M 2300/0082* (2013.01)

(58) Field of Classification Search
CPC combination set(s) only.
See application file for complete search history.

(56) References Cited

FOREIGN PATENT DOCUMENTS

| JP | 2013-038070 A | 2/2013 |
| JP | 2013038070 A * | 2/2013 |
| JP | 2016-213057 A | 12/2016 |

OTHER PUBLICATIONS

Park et al., "High temperature stable lithium ion polymer battery" Elsevier (Year: 2001).*
Yan, K., et al. Selective deposition and stable encapsulation of lithium through heterogeneous seeded growth, 2016, Nature energy (Year: 2016).*

(Continued)

*Primary Examiner* — Ula C Ruddock
*Assistant Examiner* — Sarika Gupta
(74) *Attorney, Agent, or Firm* — Dickinson Wright, PLLC

(57) ABSTRACT

A negative electrode is a negative electrode for a metal secondary battery. In a full-charge state of the metal secondary battery, the negative electrode includes a first metal and a second metal. A carbon fiber aggregate includes a plurality of carbon fibers. The first metal is an alkali metal or an alkaline earth metal. The second metal is a metal alloyable with or an alloy alloyable with the first metal. The second metal is carried at least at a central portion of the carbon fiber aggregate in a thickness direction of the carbon fiber aggregate. The second metal is in the form of particles.

9 Claims, 5 Drawing Sheets

(56) References Cited

OTHER PUBLICATIONS

Zheng Liang et al., "Composite lithium metal anode by melt infusion of lithium into a 3D conducting scaffold with lithiophilic coating," PNAS, Mar. 15, 2016, vol. 113, No. 11, pp. 2862-2867.
Kai Yan et al., "Selective deposition and stable encapsulation of lithium through heterogeneous seeded growth," Nature Energy, Article No. 16010, Feb. 22, 2016.

* cited by examiner

NEGATIVE ELECTRODE FOR METAL SECONDARY BATTERY, METAL SECONDARY BATTERY, AND METHOD OF PRODUCING METAL SECONDARY BATTERY

This nonprovisional application is based on Japanese Patent Application No. 2018-018150 filed on Feb. 5, 2018, with the Japan Patent Office, the entire contents of which are hereby incorporated by reference.

BACKGROUND

Field

The present disclosure relates to a negative electrode for a metal secondary battery, a metal secondary battery, and a method of producing a metal secondary battery.

Description of the Background Art

Japanese Patent Laying-Open No. 2013-038070 discloses a negative electrode active material for a lithium-ion secondary battery. The negative electrode active material is produced by deposition, on carbon fibers, of a metal that is alloyable with lithium or an alloy of two or more metals that are alloyable with lithium.

SUMMARY

Lithium-ion secondary batteries and sodium-ion secondary batteries are conventionally developed. The negative electrode of these secondary batteries includes intercalated graphite such as graphite and hard carbon. The intercalated graphite reacts with charge carriers, such as lithium (Li) ions, at a potential that is higher than the deposition potential of the charge carriers. As a result of this reaction, electrons are transferred. For this reason, these secondary batteries such as lithium-ion secondary batteries are used at a potential at which charge carriers are not deposited as metal.

Beside the research on these secondary batteries such as lithium-ion secondary batteries, research on metal secondary batteries has also been underway. The "metal secondary battery" herein refers to a secondary battery that includes a metal, such as lithium (Li), as a negative electrode active material. As an example of the metal secondary battery, a Li metal secondary battery is described which includes Li as a negative electrode active material. In a Li metal secondary battery, transfer of electrons at the negative electrode takes place as a result of dissolution reaction and deposition reaction of Li metal. More specifically, the potential of the negative electrode in a full-charge state is low enough for Li ions to be deposited as metal. It is expected that the energy density of Li metal secondary batteries is higher than the energy density of conventional Li-ion secondary batteries.

Li metal secondary batteries have a challenge to overcome in terms of charge-discharge reversibility. Deposited Li metal tends to grow dendritically. During the discharging process, dissolution of the dendritically grown Li metal is considered to take place readily at a portion (namely, a base portion) thereof in contact with the substrate at which the electronic resistance between the dendritically grown Li metal and the substrate is low, as well as in a region adjacent to the base portion. It is considered that upon dissolution of the base portion where the dendritically grown Li metal is in contact with the substrate, the metal comes off the substrate and no longer readily re-dissolves in the electrolyte solution.

Hereinafter, dendritic growth of a metal (such as Li metal) is also called "dendritic growth". A dendritically grown metal is also called "dendritic metal"; for example, dendritically grown Li metal is also called "dendritic Li".

When the negative electrode active material disclosed in Japanese Patent Laying-Open No. 2013-038070 is used, dendritic Li may be deposited on carbon fibers. It is considered that this potential deposition of dendritic Li leaves room for improvement in charge-discharge-cycle capacity retention.

An object of the present disclosure is to provide a negative electrode that is for a metal secondary battery and is capable of reducing degradation in charge-discharge-cycle capacity retention, as well as a metal secondary battery that includes the negative electrode.

In the following, the technical structure and the effects according to the present disclosure are described. It should be noted that part of an action mechanism according to the present disclosure is based on presumption. Therefore, the scope of claims should not be limited by whether or not the action mechanism is correct.

[1] The present disclosure relates to a negative electrode for a metal secondary battery. In a full-charge state of the metal secondary battery, the negative electrode includes a carbon fiber aggregate, a first metal, and a second metal. The carbon fiber aggregate includes a plurality of carbon fibers. The first metal is an alkali metal or an alkaline earth metal. The second metal is a metal alloyable with or an alloy alloyable with the first metal. The second metal is carried at least at a central portion of the carbon fiber aggregate in a thickness direction of the carbon fiber aggregate. The second metal is in the form of particles.

It is considered that in the negative electrode for a metal secondary battery according to the present disclosure, the deposition potential of the first metal is reached while the metal secondary battery is being charged to a full-charge state. It is considered that as a result of this phenomenon, the first metal is deposited within the negative electrode and consequently a negative electrode including the first metal is obtained. The "full-charge state" herein refers to a state in which the state of charge (SOC) is 100%; more specifically, the term refers to a state in which the metal secondary battery has been charged to the end-of-charge voltage that has been determined in advance for reversible charge-discharge cycles.

In the negative electrode for a metal secondary battery according to the present disclosure, the carbon fiber aggregate is used as a carrier of the second metal. The "carbon fiber aggregate" herein refers to an aggregate of many carbon fibers that are physically entangled to each other.

It is considered that on a surface of the carbon fiber aggregate, more specifically on a surface of each of a plurality of carbon fibers, metal nucleation takes place. In other words, it is expected that the number of metal nuclei (which is equivalent or almost equivalent to the number of points at which metal deposition starts) is higher in this type of electrode than in a plate-like electrode. Because of this potential increase in the number of metal nuclei, dendritic metal growth is expected to be reduced.

It is also considered that in the interior of the carbon fiber aggregate, the dendritic metal (after formed) readily comes into contact with surrounding carbon fibers. The carbon fibers are electronically conductive. As a result of the dendritic metal thus coming into contact with surrounding carbon fibers, the flow of electrons from the dendritic metal to the carbon fibers during the discharging process is expected to be promoted. Then as a result of the promoted flow of electrons, the dendritic metal is expected to be redissolved.

The second metal is a metal alloyable with or an alloy alloyable with the first metal (negative electrode active material). The term "alloyable" herein refers to a state in which the second metal has a certain relationship with the first metal; more specifically, the term refers to a state in which the first metal grows by using the second metal as a seed. The second metal is carried at least at a central portion of the carbon fiber aggregate in a thickness direction of the carbon fiber aggregate. The second metal, which is in the form of particles, is expected to serve as a seed for nucleation of the first metal. Because the nucleation of the first metal takes place by using the second metal particles as seeds, the nucleation of the first metal is expected to take place selectively at least at a central portion of the carbon fiber aggregate in a thickness direction of the carbon fiber aggregate. As a result of the selective deposition of the first metal at least at a central portion of the carbon fiber aggregate in a thickness direction of the carbon fiber aggregate, dendritic metal growth is expected to be reduced.

As a result of the synergistic action of these phenomena, the metal secondary battery according to the present disclosure is considered to have a reduced level of dendritic metal growth. Then as a result of the reduced level of dendritic metal growth, degradation in charge-discharge-cycle capacity retention is expected to be mitigated as well.

In the negative electrode for a metal secondary battery according to the present disclosure, the carbon fiber aggregate itself functions as a current collector of the negative electrode. In addition, it is considered that the carbon fiber aggregate can stand on its own without a support because a plurality of the constituent carbon fibers are bonded to each other. Therefore, it is considered that the negative electrode for a metal secondary battery according to the present disclosure does not necessarily require a conductive support (such as a copper foil sheet).

[2] The second metal may be carried within the carbon fiber aggregate, and the amount of the second metal thus carried is not lower than 0.0046 mol % and not higher than 1.39 mol % relative to the amount of the first metal.

When the amount of the second metal in the negative electrode is within the above range, dendritic metal growth is expected to be reduced.

[3] The first metal may be Li.

It is considered that Li ions are also occluded by the carbon fiber aggregate. As a result of the occlusion of some of the Li ions by the carbon fibers, uniform nucleation and nuclei growth of Li metal are considered to be obtained. Consequently, dendritic Li growth is expected to be reduced.

[4] The second metal may contain one type of metal selected from the group of metals consisting of gold, platinum, magnesium, zinc, tungsten, molybdenum, aluminum, gallium, indium, silicon, germanium, tin, lead, arsenic, antimony, and bismuth. The "metal" herein refers to a metal elementary substance and an alloy.

By using the second metal that contains one type of metal selected from the above group of metals, dendritic metal growth is expected to be reduced.

[5] The second metal may contain gold.

When the second metal contains gold, dendritic metal growth is expected to be reduced remarkably.

[6] The metal secondary battery may further include an ionically-conductive polymer layer that contains an electrolyte. The ionically-conductive polymer layer partially covers a surface of the carbon fiber aggregate.

With a surface of the carbon fiber aggregate partially covered with the ionically-conductive polymer layer that contains an electrolyte, dendritic metal growth can be reduced. This potential reduction in dendritic metal growth is contributed by the fact that metal Li deposition is physically inhibited at the interface between the ionically-conductive polymer layer and the carbon fibers and consequently dendritic growth tends not to take place.

[7] In the negative electrode for a metal secondary battery having the structure according to [6] above, the ionically-conductive polymer layer may contain polyvinylidene fluoride-hexafluoropropene copolymer (PVDF-HFP).

PVDF-HFP has a high electrolyte retention capability and is therefore considered to be capable of exhibiting a high ionic conductivity. When the carbon fiber aggregate is at least partially covered with the PVDF-HFP-containing ionically-conductive polymer layer, convergence of current to the tip of the deposited first metal (namely, the dendritic metal) is considered to be reduced. As a result, dendritic metal growth is expected to be further reduced.

[8] The metal secondary battery according to the present disclosure includes at least the negative electrode according to any one of [1] to [7] above, a positive electrode, and an electrolyte. In the metal secondary battery according to the present disclosure, degradation in charge-discharge-cycle capacity retention is expected to be mitigated.

[9] A method of producing the metal secondary battery includes at least the following (A) to (E):

(A) preparing the negative electrode according to any one of [1] to [7] above;

(B) preparing the positive electrode;

(C) preparing the electrolyte;

(D) assembling the metal secondary battery that includes at least the positive electrode, the negative electrode, and the electrolyte; and (E) charging the metal secondary battery.

By this method, a metal secondary battery having the structure according to [8] above may be produced.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments according to the present disclosure (herein called "present embodiment") are described. The scope of claims is not limited to the description below. Hereinafter, a metal secondary battery is also simply referred to as "battery".

<Metal Secondary Battery>

Figure 1:
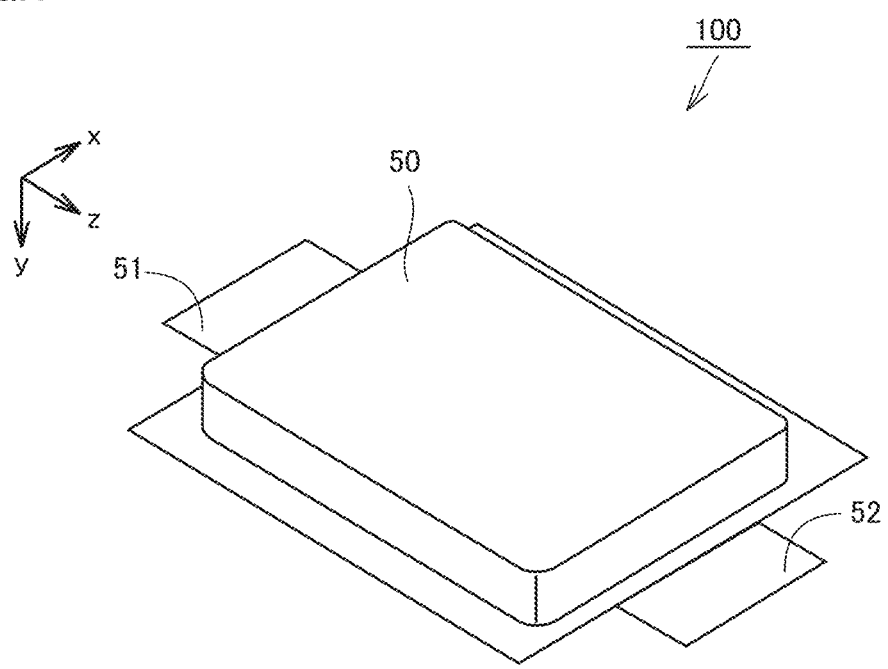
FIG. 1 is a first schematic view illustrating the structure of the metal secondary battery according to the present embodiment.

FIG. 1 is a schematic view illustrating the structure of a metal secondary battery according to the present embodiment.

A battery 100 includes a covering 50. Covering 50 is made of an aluminum-laminated film. More specifically, battery 100 is a laminate-type battery. In the present embodiment, the type and the shape of battery 100 are not particularly limited. Battery 100 may be a prismatic battery, for example. Battery 100 may be a cylindrical battery, for example. Each of a positive electrode tab 51 and a negative electrode tab 52 is provided so as to allow for communication between inside and outside covering 50. Positive electrode tab 51 is a thin aluminum (Al) plate, for example. Negative electrode tab 52 is a thin copper (Cu) plate, for example.

Figure 2:
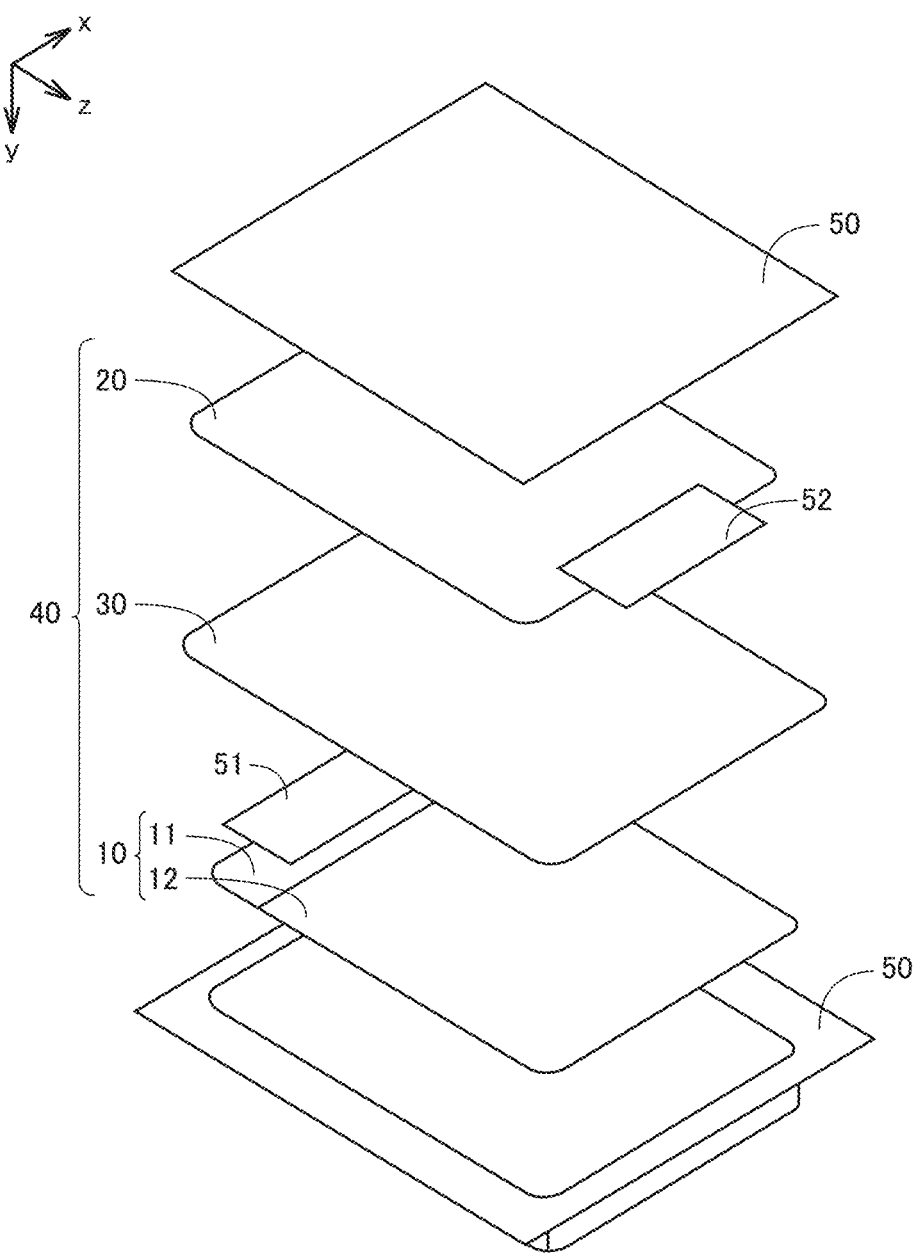
FIG. 2 is a second schematic view illustrating the structure of the metal secondary battery according to the present embodiment.

FIG. 2 is a second schematic view illustrating the structure of the metal secondary battery according to the present embodiment.

Covering 50 accommodates an electrode array 40 and an electrolyte (not shown). Electrode array 40 is a stack-type one. Alternatively, electrode array 40 may be a wound-type one. Electrode array 40 includes a positive electrode 10, a negative electrode 20, and a separator 30. In other words, battery 100 includes at least positive electrode 10, negative electrode 20, and the electrolyte.

Electrode array 40 is formed by stacking positive electrode 10 and negative electrode 20. Electrode array 40 may be formed by alternately stacking one positive electrode 10 and one negative electrode 20 and then repeating this alternate stacking process more than once. In each space between positive electrode 10 and negative electrode 20, separator 30 is interposed. Positive electrode tab 51 is bonded to positive electrode 10. Negative electrode tab 52 is bonded to negative electrode 20.

<Negative Electrode>

Figure 3:
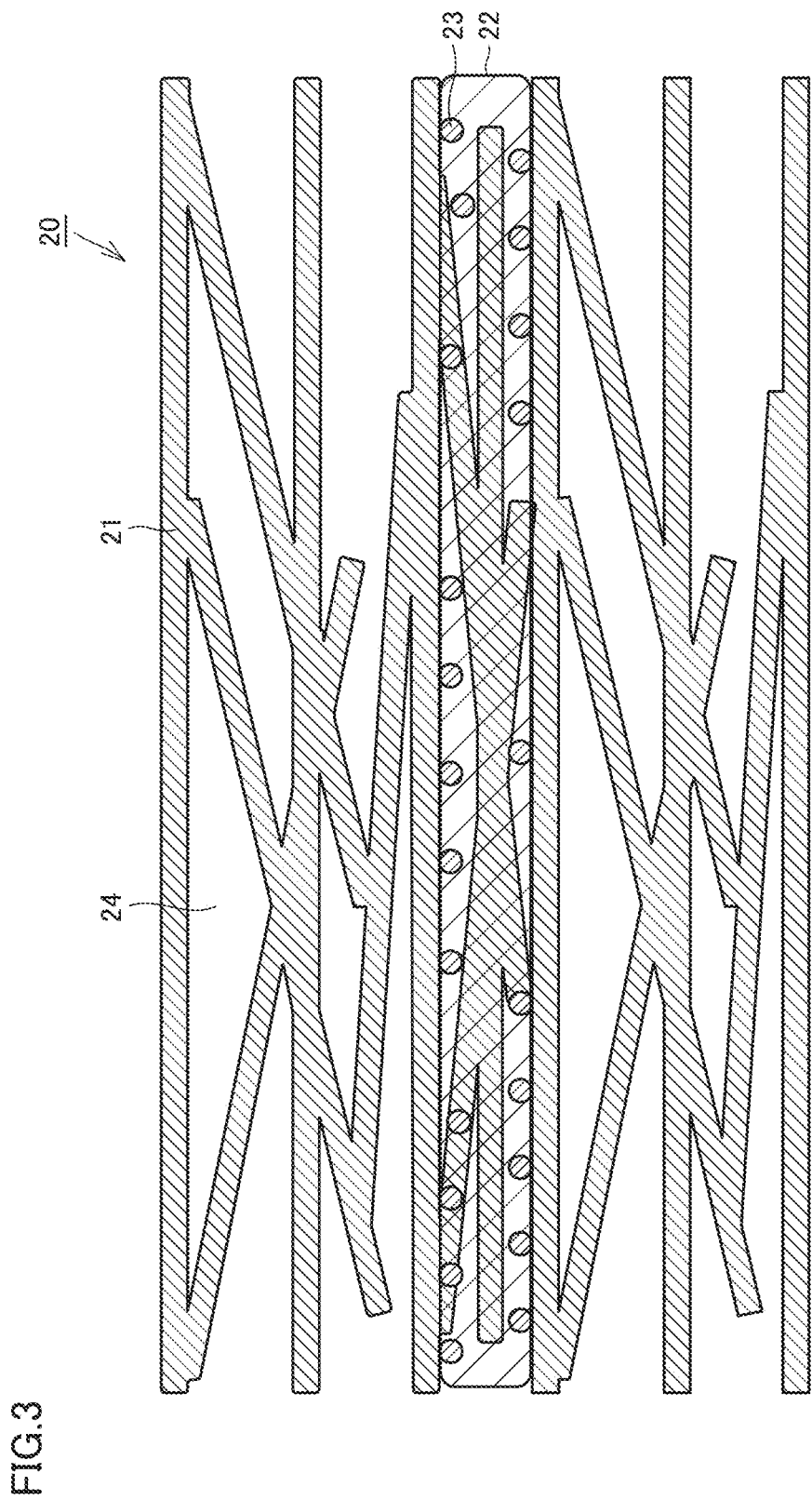
FIG. 3 is a conceptual sectional view illustrating the structure of the negative electrode according to the present embodiment.

FIG. 3 is a conceptual sectional view illustrating the structure of the negative electrode according to the present embodiment.

Negative electrode 20 may be in sheet form. In a full-charge state of battery 100, negative electrode 20 includes a carbon fiber aggregate 21, a first metal 22, and a second metal 23. Carbon fiber aggregate 21 includes a plurality of carbon fibers. These carbon fibers are in contact with each other. In the interior of carbon fiber aggregate 21, a plurality of pores 24 are present. First metal 22 is an alkali metal or an alkaline earth metal. Second metal 23 is a metal alloyable with or an alloy alloyable with first metal 22.

As shown in FIG. 3, second metal 23 is carried at least at a central portion of carbon fiber aggregate 21 in a thickness direction of carbon fiber aggregate 21. Second metal 23 is in the form of particles. The "central portion of carbon fiber aggregate 21 in a thickness direction of carbon fiber aggregate 21" herein refers to an intermediate point of carbon fiber aggregate 21 in a thickness direction of carbon fiber aggregate 21. Depending on the charge state of battery 100, the state of negative electrode 20 varies. More specifically, the amount of first metal 22 in negative electrode 20 in battery 100 that is not fully charged may be lower than the amount of first metal 22 in negative electrode 20 in battery 100 that is in a full-charge state.

Deposition of first metal 22 takes place when battery 100 is charged to the deposition potential of first metal 22. Now, as described above, second metal 23 is a metal alloyable with or an alloy alloyable with first metal 22. Therefore, as shown in FIG. 3, nucleation of first metal 22 is considered to take place at least at a central portion of carbon fiber aggregate 21 in a thickness direction of carbon fiber aggregate 21 by using second metal 23 as a seed. When deposition of first metal 22 takes place selectively at least at a central portion of carbon fiber aggregate 21 in a thickness direction of carbon fiber aggregate 21, dendritic growth of first metal 22 is considered to be reduced. As a result, degradation in charge-discharge-cycle capacity retention is expected to be mitigated.

Figure 4:
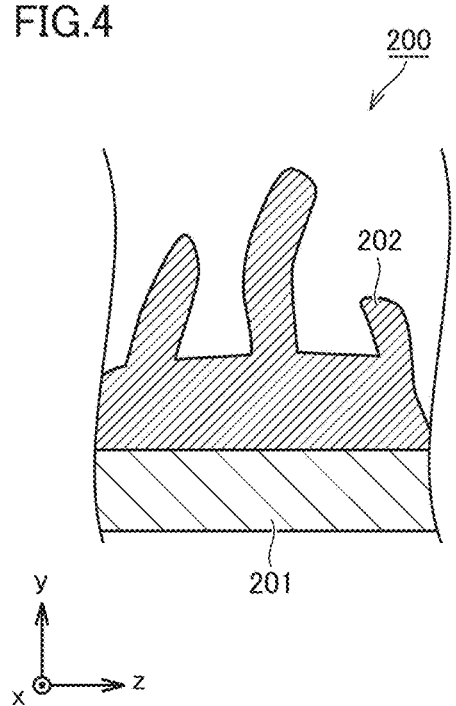
FIG. 4 is a conceptual sectional view illustrating the structure of a negative electrode according to a reference embodiment.

FIG. 4 is a conceptual sectional view illustrating the structure of a negative electrode according to a reference embodiment.

In a negative electrode 200, a copper foil sheet 201 is used as the substrate. On the surface of copper foil sheet 201, a Li metal 202 is deposited. In this structure, dendritic growth of Li metal 202 is considered to take place.

(Carbon Fiber Aggregate)

Carbon fiber aggregate 21 is a substrate of negative electrode 20. Carbon fiber aggregate 21 may be in sheet form, for example. Carbon fiber aggregate 21 may have a thickness not smaller than 50 µm and not greater than 500 µm, for example. The thickness of carbon fiber aggregate 21 is measured with a micrometer, for example. The thickness is measured at at least three positions. The arithmetic mean of these at least three thickness measurements is used as the thickness of carbon fiber aggregate 21.

The carbon fibers constitute carbon fiber aggregate 21. The carbon fibers may be PAN-based carbon fibers, pitch-based carbon fibers, cellulose-based carbon fibers, and/or vapor grown carbon fibers, for example. PAN-based carbon fibers refer to carbon fibers produced by using polyacrylonitrile (PAN) as raw material. Pitch-based carbon fibers refer to carbon fibers produced by using petroleum pitch and/or the like as raw material. Cellulose-based carbon fibers refer to carbon fibers produced by using viscose rayon and/or the like as raw material.

Desirably, the carbon fibers are graphitized carbon fibers. The graphitized carbon fibers are expected to readily occlude Li ions in the case in which first metal 22 is Li. Occlusion of Li ions by the carbon fibers is expected to lead to a uniform nucleation of Li metal. As a result, dendritic growth of Li (first metal 22) is considered to be reduced.

The carbon fibers constituting carbon fiber aggregate 21 may be bonded to each other. The carbon fibers may be bonded by the method described below, for example. The carbon fibers and a binder are mixed, and thus a mixture is prepared. The resulting mixture is heated in an inert atmosphere, and thus the carbon fibers and the binder are graphitized. As a result, the carbon fibers may be bonded to each other. The binder may be coal tar, petroleum pitch, phenolic resin, and/or epoxy resin, for example. When the carbon fibers are bonded to each other, carbon fiber aggregate 21 is expected to be strong enough to stand on its own.

The carbon fibers may have an average diameter not smaller than 1 µm and not greater than 50 µm, for example. The average diameter may be the average of the diameters of 100 or more carbon fibers, for example. The carbon fibers may have a number average fiber length not smaller than 1 mm and not greater than 50 mm, for example. The number average fiber length may be the average of the fiber lengths of 100 or more carbon fibers, for example.

(Porosity)

Desirably, carbon fiber aggregate 21 has a porosity not lower than 70% and not higher than 90%. When the porosity is lower than 70%, the interior space of carbon fiber aggregate 21 is small and therefore first metal 22 is considered to be deposited on the outer surface of carbon fiber aggregate 21. As a result, mitigation of degradation in charge-discharge-cycle capacity retention can be difficult. When the porosity is higher than 90%, the surface area of carbon fiber aggregate 21 decreases and thereby local convergence of current readily occurs, leading to a potential difficulty in mitigation of degradation in charge-discharge-cycle capacity retention.

The "porosity" herein refers to the ratio of the volume of pores to the volume of carbon fiber aggregate 21. The porosity is measured with a typical mercury porosimeter. The porosity is measured at least three times. The arithmetic mean of these at least three measurements is used as the porosity of carbon fiber aggregate 21.

(First Metal)

In a full-charge state of the metal secondary battery, first metal 22 is included in negative electrode 20. First metal 22 is a negative electrode active material. First metal 22 is an alkali metal or an alkaline earth metal. The alkali metal may be Li, sodium (Na), or potassium (K), for example. The alkaline earth metal may be magnesium (Mg) or calcium (Ca), for example. In other words, first metal 22 may be Li, Na, K, Mg, or Ca. Desirably, first metal 22 is Li.

In a full-charge state of battery 100, the capacity of negative electrode 20 is considered to be equivalent to the stoichiometric capacity of positive electrode 10 (namely, the stoichiometric capacity of a positive electrode composite material layer 12). Based on the assumption that the area of positive electrode 10 is equivalent to the area of negative electrode 20 (as shown in FIG. 2, for example), it is considered that in a full-charge state of battery 100, the capacity (mAh/cm$^2$) of negative electrode 20 per unit area is equivalent to the capacity (mAh/cm$^2$) of positive electrode composite material layer 12 per unit area. Therefore, the amount of first metal 22 in negative electrode 20 in a full-charge state of battery 100 can be calculated by the method described below.

The mass of positive electrode composite material layer 12 per unit area is defined as A (g/cm$^2$), and the stoichiometric capacity of positive electrode composite material layer 12 per unit mass is defined as B (mAh/g). The product of A and B is the stoichiometric capacity, C (mAh/cm$^2$), of positive electrode composite material layer 12 per unit area.

Then, the stoichiometric capacity of first metal 22 per unit mass is defined as D (mAh/g). Now, the stoichiometric capacity (mAh/cm$^2$) of negative electrode 20 per unit area is considered to be equivalent to the stoichiometric capacity, C (mAh/cm$^2$), of positive electrode composite material layer 12 per unit area. Therefore, by dividing C by D, the content, E (g/cm$^2$), of first metal 22 per unit area of negative electrode 20 is obtained.

The weight of 1 mol of first metal 22 is defined as F (g/mol). By dividing E by F, the number of moles (mol/cm$^2$) of first metal 22 per unit area of negative electrode 20 is obtained. Thus, the amount (number of moles) of first metal 22 in negative electrode 20 can be calculated.

(Second Metal)

In a full-charge state of the metal secondary battery, second metal 23 is included in negative electrode 20. Second metal 23 is carried at least at a central portion of carbon fiber aggregate 21 in a thickness direction of carbon fiber aggregate 21. Being a metal alloyable with or an alloy alloyable with first metal 22, second metal 23 is expected to serve as a seed for nucleation of first metal 22. When the nucleation of first metal 22 takes place using second metal 23 as a seed, deposition of first metal 22 is expected to take place selectively at least at a central portion of carbon fiber aggregate 21 in a thickness direction of carbon fiber aggregate 21. In other words, dendritic metal growth is expected to be reduced.

In a full-charge state of battery 100, the amount of second metal 23 carried by carbon fiber aggregate 21 may be not lower than 0.0046 mol % and not higher than 1.39 mol % relative to the amount of first metal 22 (100 mol %) in negative electrode 20.

When the amount of second metal 23 carried within carbon fiber aggregate 21 is lower than 0.0046 mol % relative to the amount of first metal 22 (100 mol %) in negative electrode 20 in a full-charge state of battery 100, it is considered that the absolute amount of second metal 23 is insufficient. In this case, nucleation of first metal 22 using second metal 23 as a seed may proceed insufficiently and reduction of dendritic metal growth may also be insufficient.

When the amount of second metal 23 carried within carbon fiber aggregate 21 is higher than 1.39 mol % relative to the amount of first metal 22 (100 mol %) in negative electrode 20 in a full-charge state of battery 100, it is considered that the absolute amount of second metal 23 is excessive. In this case, formation of negative electrode 20 can be difficult to proceed.

Second metal 23 is in the form of particles. Being in the form of particles, second metal 23 is expected to serve as a seed for nucleation of first metal 22. As long as it is in the form of particles, second metal 23 is not particularly limited in terms of shape. The shape of second metal 23 may be amorphous, spherical, or ellipsoidal, for example. The size of second metal 23 is not particularly limited. The particle size of second metal 23 may be of the nanometer scale. In other words, second metal 23 may be nanoparticles. The nanoparticles may have a particle size not smaller than 1 nm and not greater than 200 nm, for example.

Second metal 23 may contain one type of metal selected from the group of metals consisting of gold, platinum, magnesium, zinc, tungsten, molybdenum, aluminum, gallium, indium, silicon, germanium, tin, lead, arsenic, antimony, and bismuth, for example. Containing one type of metal selected from the above group of metals, second metal 23 is considered to serve as a seed for nucleation of first metal 22. In this case, nuclei growth of first metal 22 is promoted and thereby dendritic metal growth is expected to be reduced.

Desirably, second metal 23 contains gold. When second metal 23 contains gold, dendritic metal growth is expected to be reduced.

(Ionically-Conductive Polymer Layer)

Negative electrode 20 may further contain an ionically-conductive polymer layer that contains an electrolyte (hereinafter, also simply called "ionically-conductive polymer layer"). Carbon fiber aggregate 21 may be at least partially covered with the ionically-conductive polymer layer. Desirably, all the carbon fibers in carbon fiber aggregate 21 are covered with the ionically-conductive polymer layer. When a surface of carbon fiber aggregate 21 is at least partially covered with the ionically-conductive polymer layer, non-uniform coating formation on a surface of deposited dendritic metal may be reduced. In this case, dendritic metal growth is expected to be reduced. The thickness of the covering ionically-conductive polymer layer may be not smaller than 1 μm and not greater than 20 μm, for example.

An ionically-conductive polymer material may be PVDF-HFP, polyvinylidene difluoride (PVDF), polyethylene oxide (PEO), polyvinyl alcohol (PVA), polyacrylic acid (PAA), and/or polymethyl methacrylate (PMMA), for example. One type of the polymer material may be used alone. Two or more types of the polymer material may be used in combination. The polymer material or materials may have a cross-linkage.

The ionically-conductive polymer material may be ionically conductive itself. Alternatively, the ionically-conductive polymer material may attain ionic conductivity by absorbing electrolyte. Desirably, the ionically-conductive polymer material is PVDF-HFP. In other words, it is desirable that the ionically-conductive polymer layer contains PVDF-HFP. PVDF-HFP is expected to exhibit a high level of ionic conductivity by absorbing electrolyte. When the ionically-conductive polymer layer exhibits a high level of ionic conductivity, it is expected that convergence of current to the tip of the deposited first metal 22 is reduced and consequently dendritic metal growth is reduced.

<Positive Electrode>

Positive electrode 10 may be in sheet form. Positive electrode 10 includes a positive electrode current collector 11 and positive electrode composite material layer 12, for example. Positive electrode current collector 11 may be an Al foil sheet or an Al alloy foil sheet, for example. Positive electrode current collector 11 may have a thickness not smaller than 10 μm and not greater than 50 μm, for example.

Positive electrode composite material layer 12 is formed on a surface of positive electrode current collector 11. Positive electrode composite material layer 12 may be formed on both sides of positive electrode current collector 11. Positive electrode composite material layer 12 may have a thickness not smaller than 10 μm and not greater than 200 μm, for example. Positive electrode composite material layer 12 contains at least a positive electrode active material. In other words, positive electrode 10 contains at least a positive electrode active material.

The positive electrode active material is a substance into which ions derived from first metal 22 may be reversibly inserted. When first metal 22 is Li, the positive electrode active material may be $LiCoO_2$, $LiNiO_2$, $LiMnO_2$, $LiMn_2O_4$, $Li(Ni, Co, Mn)O_2$ (such as $LiNi_{1/3}Co_{1/3}Mn_{1/3}O_2$), and/or $LiFePO_4$, for example. When first metal 22 is Na, the positive electrode active material may be $NaCoO_2$ and/or $NaFeO_2$, for example. One type of the positive electrode active material may be used alone. Two or more types of the positive electrode active material may be used in combination.

Positive electrode composite material layer 12 may further contain a conductive material and a binder. The conductive material may be carbon black, for example. The content of the conductive material may be, for example, not lower than 1 part by mass and not higher than 10 parts by mass relative to 100 parts by mass of the positive electrode active material. The binder is not particularly limited. The binder may be PVDF, for example. The content of the binder may be, for example, not lower than 1 part by mass and not higher than 10 parts by mass relative to 100 parts by mass of the positive electrode active material.

<Electrolyte>

The electrolyte is a substance within which ions derived from first metal 22 can move for conduction. The electrolyte may be a liquid electrolyte. The electrolyte may be a gelled electrolyte. The electrolyte may be a solid electrolyte. The liquid electrolyte may be an electrolyte solution, for example. The electrolyte solution may contain a supporting salt and a solvent. When first metal 22 is Li, the supporting salt may be, for example, $LiPF_6$, $LiBF_4$, and/or $LiN(SO_2F)_2$. When first metal 22 is Na, the supporting salt may be, for example, $NaClO_4$. The electrolyte solution may contain the supporting salt in an amount not lower than 0.5 mol/L and not higher than 2 mol/L, for example. The electrolyte solution may contain the supporting salt in an amount not lower than 3 mol/L and not higher than 5 mol/L, for example.

The solvent may be ethylene carbonate (EC), propylene carbonate (PC), dimethyl carbonate (DMC), ethyl methyl carbonate (EMC), diethyl carbonate (DEC), acetonitrile (AN), N,N-dimethylformamide (DMF), 1,2-dimethoxyethane (DME), and/or dimethyl sulfoxide (DMSO), for example. One type of the solvent may be used alone. Two or more types of the solvent may be used in combination.

<Separator>

Separator 30 may be in film form. Separator 30 may have a thickness not smaller than 10 μm and not greater than 50 μm, for example. Separator 30 is porous. Separator 30 is electrically insulating. Separator 30 may be a porous polyethylene (PE) film or a porous polypropylene (PP) film, for example.

Separator 30 may have a monolayer structure. Separator 30 may consist of a porous PE film, for example. Separator 30 may have a multilayer structure. Separator 30 may be formed by stacking a porous PP film, a porous PE film, and a porous PP film in this order, for example.

<Method of Producing Metal Battery>

The metal secondary battery according to the present embodiment may be produced by the production method described below, for example.

Figure 5:
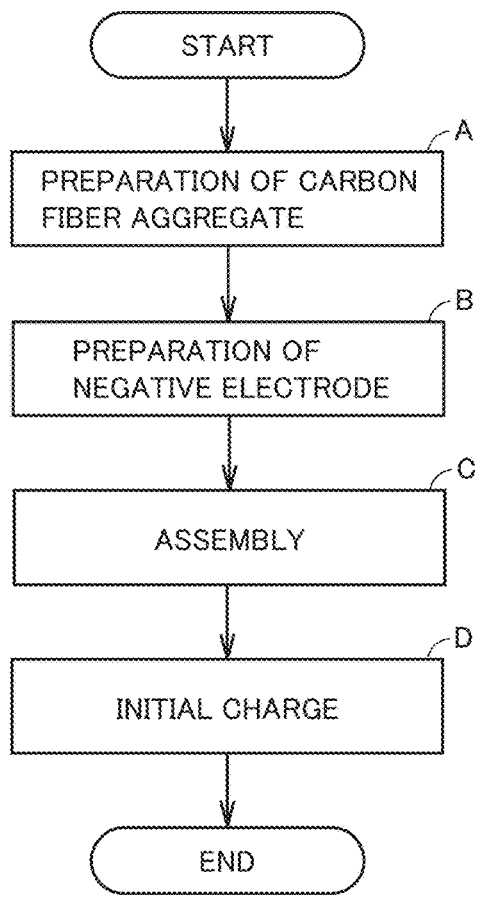
FIG. 5 is a flow chart schematically illustrating the method of producing the metal secondary battery according to the present embodiment.

FIG. 5 is a flow chart schematically illustrating the method of producing the metal secondary battery according to the present embodiment. The production method according to the present embodiment includes at least "(A) preparation of carbon fiber aggregate 21", "(B) preparation of the negative electrode", "(C) assembly", and "(D) initial charge".

<<(A) Preparation of Carbon Fiber Aggregate 21>>

The production method according to the present embodiment includes preparing carbon fiber aggregate 21 for use as a substrate of negative electrode 20. For example, two carbon fiber aggregates 21 are prepared. These two carbon fiber aggregates 21 may have the same length, the same width, and/or the same thickness. Carbon fiber aggregate 21 may be purchased. For example, TGP-H-030 manufactured by Toray Industries, Inc., MFL-L manufactured by Mitsubishi Rayon Co., Ltd., and/or S-259P manufactured by Osaka Gas Chemicals Co., Ltd. may be prepared as carbon fiber aggregate 21.

<<(B) Preparation of Negative Electrode 20>>

Second metal 23 in the form of particles is prepared. Second metal 23 is made carried on a surface (one side) of each of the two carbon fiber aggregates 21. Thus, two carbon fiber aggregates 21 each carrying particles of second metal 23 on a surface (one side) thereof may be prepared (hereinafter, each of such carbon fiber aggregates 21 is also called "second-metal-carried-on-one-side substrate"). Second metal 23 may be made carried on a surface of each of the two carbon fiber aggregates 21 by magnetron sputtering, vacuum deposition, CVD, ion plating, and/or plating, for example. The resulting two second-metal-carried-on-one-side substrates are stacked in such a way that their metal-carrying sides are in contact with each other. Thus, negative electrode 20 (namely, carbon fiber aggregates 21 carrying particles of second metal 23 at a central portion thereof in a thickness direction thereof) may be obtained.

<<(C) Assembling Battery 100>>

The method of producing a battery according to the present embodiment includes assembling battery 100 that includes at least negative electrode 20 obtained in the above-mentioned manner, positive electrode 10, and an electrolyte.

For example, positive electrode 10 and separator 30 are prepared. Positive electrode 10 and separator 30 are described above in detail. By alternately stacking positive electrode 10 and negative electrode 20 with separator 30 interposed between positive electrode 10 and negative electrode 20, electrode array 40 may be formed.

Covering 50 and the electrolyte are prepared. Covering 50 and the electrolyte are described above in detail. Electrode array 40 and the electrolyte are placed inside covering 50. Covering 50 is hermetically sealed. Thus, battery 100 is assembled.

<<(D) Initial Charge>>

The method of producing a battery according to the present embodiment includes charging battery 100. Battery 100 is charged until the deposition potential of first metal 22 is reached. By this procedure, first metal 22 is made carried by carbon fiber aggregate 21. When first metal 22 is Li, for example, battery 100 may be charged to 4.2 V. The current density during the charging process is not particularly limited. For example, the current density may be equivalent to about 1/10 C. At a rate of "1 C", charging of battery 100 to the rated capacity completes in one hour. The current density may be about 1 mA/cm$^2$, for example.

After the charging process, battery 100 may be discharged. When first metal 22 is Li, for example, battery 100 may be discharged to 3.0 V. Thus, battery 100 may be produced.

EXAMPLES

In the following, examples according to the present disclosure are described. The scope of claims is not limited to the description below.

<Production of Battery>

Example 1

1. Production of Positive Electrode

A paste was applied to a surface of positive electrode current collector 11 (Al foil sheet), and thus positive electrode composite material layer 12 was formed. In this way, positive electrode 10 was produced. Positive electrode 10 was cut into a predetermined size. Positive electrode composite material layer 12 (one side) had a weight per unit area of 16 mg/cm$^2$. Positive electrode composite material layer 12 contained a positive electrode active material (Li(Ni, Co, Mn)O$_2$), a conductive material (carbon black), and a binder (PVDF). More specifically, positive electrode composite material layer 12 contained Li as first metal 22.

2. Production of Negative Electrode

<<Preparation of Carbon Fiber Aggregates 21>>

As substrates of negative electrode 20, two carbon fiber aggregates 21 (PAN-based carbon fibers, in sheet form, with a thickness of 110 μm and a porosity of 80%) were prepared. Each of the two carbon fiber aggregates 21 was cut into a predetermined size.

<<Preparation of Carbon Fiber Aggregates 21 Carrying Second Metal>>

As second metal 23, gold particles were formed. Magnetron sputtering was carried out to make the gold particles (namely, particles of second metal 23) carried on a surface (one side) of each of the two carbon fiber aggregates 21. Thus, two carbon fiber aggregates 21 (second-metal-carried-on-one-side substrates) each carrying gold particles (second metal 23) on one side were prepared. The resulting two second-metal-carried-on-one-side substrates were stacked in such a way that their gold-carrying sides were in contact with each other. Thus, carbon fiber aggregates 21 (namely, negative electrode 20) carrying gold particles at a central portion thereof in a thickness direction thereof were obtained. The amount of gold carried by negative electrode 20 was 0.07 μmol/cm$^2$.

3. Assembly

Negative electrode 20, separator 30, and positive electrode 10 were stacked in this order. Thus, electrode array 40 was formed. As separator 30, a porous polyethylene film (thickness, 20 μm) was used.

Electrode array 40 was placed inside covering 50. Into covering 50, an electrolyte solution was injected. The electrolyte solution contained the components described below. Covering 50 was hermetically sealed. Thus, battery 100 was assembled.

Li salt: LiPF$_6$ (1 mol/L)
Solvent: [EC:DMC:EMC=3:4:3 (volume ratio)]

4. Initial Charge and Discharge

Figure 6:
FIG. 6 is an SEM image of the outside (surface) of the carbon fiber aggregate after charge.
Figure 7:
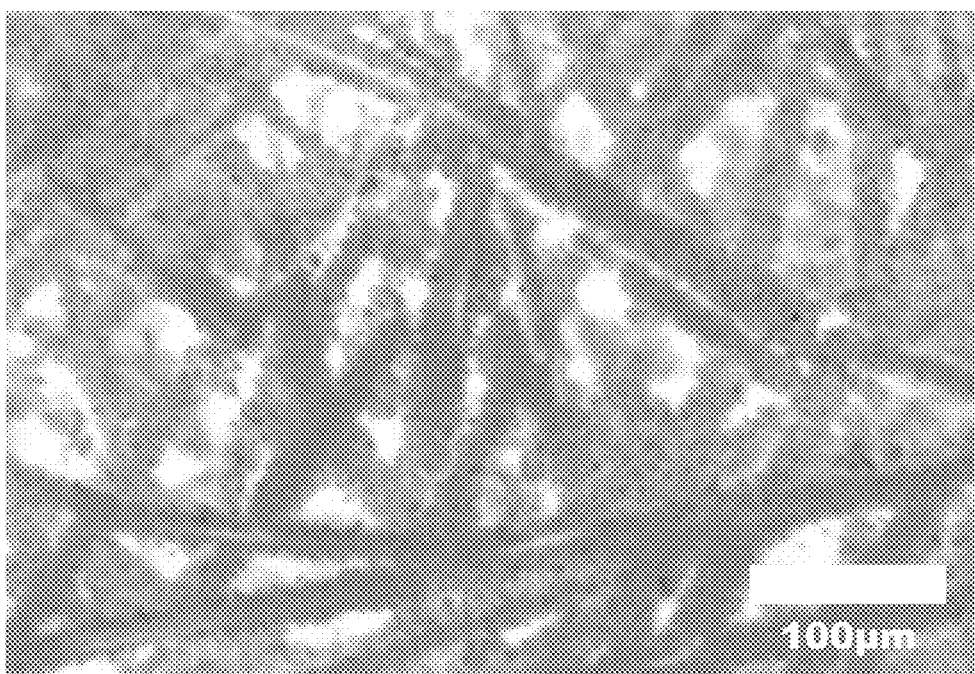
FIG. 7 is an SEM image of the interior (central portion) of the carbon fiber aggregate after charge.

Battery 100 was charged to 4.2 V. In other words, battery 100 was brought to a full-charge state. As a result of the charging process, first metal 22 (Li) was deposited within carbon fiber aggregates 21. In other words, negative electrode 20 that included carbon fiber aggregates 21, first metal 22 (Li), and second metal 23 (gold) was formed. In order to check whether nucleation of first metal 22 (Li) successfully took place in negative electrode 20 using, as seeds, particles of second metal 23 (gold) carried at a central portion of carbon fiber aggregates 21 in a thickness direction of carbon fiber aggregates 21, the following procedure was carried out: the battery charged to 3.5 V was disassembled and the negative electrode, namely carbon fiber aggregates 21, was subjected to optical microscopy and observed on the non-gold-carrying side (outside) and the gold-carrying side (central portion) (FIGS. 6 and 7). As shown in FIG. 7, metal lithium deposition was identified only on the gold-carrying side (central portion).

The values described below were used to calculate the amount of first metal 22 (Li) in negative electrode 20 in a full-charge state of battery 100. The amount was 107.5 μmol/cm$^2$, which was obtained by dividing the Li content (listed as E below) per unit area of negative electrode 20 by the weight (F) of 1 mol of Li. Then, the amount of second metal 23 (gold) carried by carbon fiber aggregates 21 relative to the amount of first metal 22 (Li) in negative electrode 20 in a full-charge state of metal secondary battery 100 was calculated as 0.065 mol %.

(A) Mass of positive electrode composite material layer 12 per unit area: 16 (mg/cm$^2$)

(B) Capacity of positive electrode composite material layer 12 per unit mass: 180 (mAh/g)

(C) Capacity of positive electrode composite material layer 12 per unit area: 2.88 (mAh/cm$^2$)

(D) Stoichiometric capacity of Li per unit mass: 3861 (mAh/g)

(E) Li content of negative electrode 20 per unit area: 745.9 (μg/cm$^2$)

(F) Weight of 1 mol of Li: 6.941 (g/mol)

Example 2

PVDF-HFP was dissolved in N-methyl-2-pyrrolidone (NMP). Thus, a polymer solution was prepared. The content of PVDF-HFP in the polymer solution was 5 mass %. In the polymer solution, the two carbon fiber aggregates 21 were immersed. After the immersion, the two carbon fiber aggregates 21 were taken out from the polymer solution. The two carbon fiber aggregates 21 were dried. The two carbon fiber aggregates 21 were analyzed with a scanning electron microscope (SEM) and an energy dispersive X-ray spectrometer (EDX). The analysis showed that the carbon fibers were covered with PVDF-HFP on their surfaces. The thickness of the covering was about several micrometers. Then, battery 100 was produced in the same manner as in Example 1 except that production of negative electrode 20 was carried out by using the two, covered carbon fiber aggregates 21.

Example 3

Battery 100 was produced in the same manner as in Example 1 except that as specified in Table 1, vacuum deposition was used to make gold particles uniformly carried by the entire carbon fiber aggregates 21.

Examples 4 to 6

Battery 100 was produced in the same manner as in Example 1 except that the amount of gold carried by negative electrode 20 was changed as specified in Table 1.

Example 7

Battery 100 was produced in the same manner as in Example 1 except that as specified in Table 1, magnesium (Mg) particles were used as second metal 23 and carried by negative electrode 20.

Comparative Example 1

Battery 100 was produced in the same manner as in Example 1 except that as specified in Table 1, production of negative electrode 20 was carried out by stacking two second-metal-carried-on-one-side substrates in such a way that their non-gold-carrying sides were in contact with each other; in other words, gold particles were carried on both sides of negative electrode 20 in a thickness direction of negative electrode 20. In this aspect, no gold particles were carried at a central portion of negative electrode 20.

Comparative Example 2

Battery 100 was produced in the same manner as in Example 1 except that as specified in Table 1, the amount of gold carried by substrates of negative electrode 20 was changed and the gold used was not in the form of particles (namely, the gold used was in the form of gold foil).

Comparative Example 3

Battery 100 was produced in the same manner as in Example 1 except that as specified in Table 1, no gold was carried by substrates of negative electrode 20.

Comparative Example 4

Battery 100 was produced in the same manner as in Example 1 except that as specified in Table 1, no gold was carried by substrates of negative electrode 20 and carbon fiber aggregates 21 were covered with PVDF-HFP (as in Example 2).

Comparative Example 5

Battery 100 was produced in the same manner as in Example 1 except that as specified in Table 1, copper foil sheets were used instead of carbon fiber aggregates 21 as substrates of negative electrode 20 and no gold was carried by the substrates of negative electrode 20.

Comparative Example 6

Battery 100 was produced in the same manner as in Example 1 except that copper foil sheets were used instead of carbon fiber aggregates 21 as substrates of negative electrode 20 and magnetron sputtering was used to make gold particles carried on surfaces of the copper foil sheets.

Comparative Example 7

Battery 100 was produced in the same manner as in Example 1 except that as specified in Table 1, nickel particles were used as second metal 23 and carried by negative electrode 20.

<Evaluation>

<<Initial Charge-Discharge Efficiency>>

The battery was charged under the conditions described below. The initial charge capacity was measured. Then, the battery was discharged under the conditions described below. The initial discharge capacity was measured. The initial discharge capacity was divided by the initial charge capacity, and thus the initial charge-discharge efficiency was calculated. Results are shown in Table 1 below, in the "Charge-discharge efficiency" column. The higher the value is, the higher the initial charge-discharge efficiency is.

Charge: constant-current mode, charging voltage of 4.2 V, current density of 1 mA/cm$^2$ Discharge: constant-current mode, discharge voltage of 3.0 V, current density of 1 mA/cm$^2$ <<Post-Tenth-Cycle Capacity Retention>>

Under an environment at 25° C., ten cycles of charge and discharge were carried out under the conditions described below. The discharged capacity measured after the tenth cycle was divided by the discharged capacity measured after the first cycle, and thus a post-tenth-cycle capacity retention was calculated. Results are shown in Table 1 below, in the "Capacity retention" column. The higher the value is, the higher the charge-discharge-cycle capacity retention is.

Charge: constant-current mode, charging voltage of 4.2 V, current density of 5 mA/cm$^2$ Discharge: constant-current mode, discharge voltage of 3.0 V, current density of 5 mA/cm$^2$

TABLE 1

| | Negative electrode | | | | | | | Evaluation | |
|---|---|---|---|---|---|---|---|---|---|
| | Substrate | Second metal | Amount of carried second metal [μmol/cm$^2$] | Amount of carried second metal*[1] [mol %] | Location of carried second metal | Form of second metal | Polymer coating treatment | Charge-discharge efficiency [%] | Capacity retention [%] |
| Ex. 1 | Carbon fiber aggregate | Gold | 0.07 | 0.065 | Central portion in thickness direction | Particles | — | 91 | 88 |

TABLE 1-continued

| | Negative electrode | | | | | | | Evaluation | |
|---|---|---|---|---|---|---|---|---|---|
| | Substrate | Second metal | Amount of carried second metal [μmol/cm²] | Amount of carried second metal*¹ [mol %] | Location of carried second metal | Form of second metal | Polymer coating treatment | Charge-discharge efficiency [%] | Capacity retention [%] |
| Ex. 2 | Carbon fiber aggregate | Gold | 0.07 | 0.065 | Central portion in thickness direction | Particles | PVDF-HFP | 92 | 95 |
| Ex. 3 | Carbon fiber aggregate | Gold | 0.07 | 0.065 | Entire surface | Particles | — | 89 | 87 |
| Ex. 4 | Carbon fiber aggregate | Gold | 0.03 | 0.028 | Central portion in thickness direction | Particles | — | 91 | 87 |
| Ex. 5 | Carbon fiber aggregate | Gold | 1.5 | 1.39 | Central portion in thickness direction | Particles | — | 92 | 87 |
| Ex. 6 | Carbon fiber aggregate | Gold | 0.005 | 0.0046 | Central portion in thickness direction | Particles | — | 86 | 86 |
| Ex. 7 | Carbon fiber aggregate | Mg | 0.07 | 0.065 | Central portion in thickness direction | Particles | — | 85 | 89 |
| Comp. Ex. 1 | Carbon fiber aggregate | Gold | 0.07 | 0.065 | Outer surface | Particles | — | 75 | 47 |
| Comp. Ex. 2 | Carbon fiber aggregate | Gold | 100 | 93 | Central portion in thickness direction | Non-particles | — | 92 | 42 |
| Comp. Ex. 3 | Carbon fiber aggregate | — | — | — | — | — | — | 88 | 67 |
| Comp. Ex. 4 | Carbon fiber aggregate | — | — | — | — | — | PVDF-HFP | 91 | 72 |
| Comp. Ex. 5 | Copper foil | — | — | — | — | — | — | 74 | 24 |
| Comp. Ex. 6 | Copper foil | Gold | 0.07 | 0.065 | On copper foil (both sides) | Particles | — | 87 | 43 |
| Comp. Ex. 7 | Carbon fiber aggregate | Nickel | 0.07 | 0.065 | Central portion in thickness direction | Particles | — | 86 | 61 |

*¹Each value is the amount (mol %) of second metal carried within the carbon fiber aggregate in a full-charge state of the battery, relative to the amount of Li in the negative electrode.

<Results>

As shown in the results from Examples 1 to 7 listed in Table 1, when carbon fiber aggregates 21 carrying gold particles or magnesium particles at least at a central portion thereof in a thickness direction thereof were used as substrates of negative electrode 20, the post-tenth-cycle capacity retention tended to be improved. It is considered that gold particles served as seeds for Li nucleation and Li nucleation took place selectively at a central portion of carbon fiber aggregates 21 in a thickness direction of carbon fiber aggregates 21. It is considered that because Li deposition took place selectively at a central portion of carbon fiber aggregates 21 in a thickness direction of carbon fiber aggregates 21, dendritic Li growth was reduced and thereby the post-tenth-cycle capacity retention was improved.

Results from Example 2 show that when surfaces of carbon fiber aggregates 21 were covered with the PVDF-HFP-containing ionically-conductive polymer layer, the post-tenth-cycle capacity retention was remarkably improved. It is considered that PVDF-HFP (ionically-conductive polymer material) reduced dendritic Li growth on outer surfaces of carbon fiber aggregates 21.

Results from Examples 5 and 6 show that the amount of second metal 23 carried within carbon fiber aggregates 21 may be not lower than 0.0046 mol % and not higher than 1.39 mol % relative to the amount of first metal 22.

Results from Comparative Example 1 show that when carbon fiber aggregates 21 carrying gold particles on their outer surfaces were used as substrates of negative electrode 20, the post-tenth-cycle capacity retention had room for improvement. It is considered that Li deposition took place selectively on surfaces of carbon fiber aggregates 21 and thereby dendritic Li growth was promoted.

Results from Comparative Example 2 show that when gold not in the form of particles (namely, a gold foil sheet) was carried at a central portion of carbon fiber aggregates 21 in a thickness direction of carbon fiber aggregates 21, the post-tenth-cycle capacity retention had room for improvement. These results showed that gold particles serve as seeds for Li nucleation.

Results from Comparative Examples 3 and 4 show that when no gold was carried by carbon fiber aggregates 21, the post-tenth-cycle capacity retention had room for improvement. It is considered that because surfaces of carbon fiber aggregates 21 did not carry gold, which was alloyable with Li, reduction in dendritic Li growth on the surfaces of carbon fiber aggregates 21 was not obtained.

Results from Comparative Examples 5 and 6 show that when copper foil sheets instead of carbon fiber aggregates 21 were used as substrates of negative electrode 20, the post-tenth-cycle capacity retention had room for improvement. From these results, it is considered that the three-dimensional structure present in carbon fiber aggregates 21 contributes to improvement in post-tenth-cycle capacity retention.

Results from Comparative Example 7 show that when nickel, which was not alloyable with first metal 22, was used as second metal 23, the post-tenth-cycle capacity retention had room for improvement. It is considered that nucleation of first metal 22 did not take place at a central portion of carbon fiber aggregates 21 in a thickness direction of carbon fiber aggregates 21.

The embodiments and examples disclosed herein are illustrative and non-restrictive in any respect. The technical scope indicated by the claims is intended to include any modifications within the scope and meaning equivalent to the terms of the claims.

What is claimed is:

1. A negative electrode for a metal secondary battery, wherein, the negative electrode includes a carbon fiber aggregate, a first metal, and a second metal in a full-charge state of the metal secondary battery, the carbon fiber aggregate comprises a plurality of carbon fibers, the first metal is an alkali metal or an alkaline earth metal, the second metal is a metal alloyable with or an alloy alloyable with the first metal, the second metal is carried at least at a central portion of the carbon fiber aggregate in a thickness direction of the carbon fiber aggregate, and the second metal is in the form of particles;

wherein the central portion of the carbon fiber aggregate in the thickness direction carries the second metal particles to facilitate nucleation of the first metal in the central portion of the carbon fiber aggregate.

2. The negative electrode according to claim 1, wherein the second metal is carried within the carbon fiber aggregate, and the amount of the second metal thus carried is not lower than 0.0046 mol % and not higher than 1.39 mol % relative to the amount of the first metal.

3. The negative electrode according to claim 1, wherein the first metal is lithium.

4. The negative electrode according to claim 1, wherein the second metal contains one type of metal selected from the group of metals consisting of gold, platinum, magnesium, zinc, tungsten, molybdenum, aluminum, gallium, indium, silicon, germanium, tin, lead, arsenic, antimony, and bismuth.

5. The negative electrode according to claim 1, wherein the second metal contains gold.

6. The negative electrode according to claim 1, wherein the negative electrode further includes an ionically-conductive polymer layer that contains an electrolyte, and a surface of the carbon fiber aggregate is at least partially covered with the ionically-conductive polymer layer.

7. The negative electrode according to claim 6, wherein the ionically-conductive polymer layer contains polyvinylidene fluoride-hexafluoropropene copolymer (PVDF-HFP).

8. A metal secondary battery comprising at least the negative electrode according to claim 1, a positive electrode, and an electrolyte.

9. A method of producing the metal secondary battery recited in claim 8, comprising at least:

preparing the negative electrode;

preparing the positive electrode;

preparing the electrolyte;

assembling a metal secondary battery that comprises at least the positive electrode, the negative electrode, and the electrolyte; and charging the metal secondary battery.

* * * * *